United States Patent Office 3,029,238
Patented Apr. 10, 1962

3,029,238
2.3-DIMERCAPTO-QUINOXALINE DERIVATIVES AND PROCESS FOR THEIR MANUFACTURE
Klaus Sasse, Koln-Stammheim, Richard Wegler, Leverkusen, Günter Unterstenhöfer, Opladen, and Ferdinand Grewe, Koln-Stammheim, Germany, assignors to Farbenfabriken Bayer Aktiengesellschaft, Leverkusen, Germany, a corporation of Germany
No Drawing. Filed Mar. 15, 1960, Ser. No. 15,045
Claims priority, application Germany Mar. 20, 1959
6 Claims. (Cl. 260—250)

The present invention relates to and has as its objects new and useful pesticidal compounds and a process for their production. Generally the new compounds of this invention are 2.3-dimercaptoquinoxalines of the following general formula

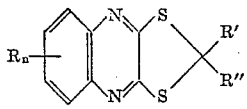

wherein R eventually stands for a substituent of the benzene nucleus and R′ and R″ stand for hydrogen or an organic radical, n indicates the number of possible nucleus substituent which may be 0 to 4.

The objects of copending application Serial No. 823,825 are acylating products of 2.3-dimercaptoquinoxaline and its derivatives possibly substituted in the nucleus. These quinoxaline derivatives are distinguished by a high acaricidal and fungicidal activity. It is already mentioned in the aforesaid patent specification that the alkylation products of 2.3-dimercapto-quinoxaline obtained, for example, by reaction with monovalent alkyl halides, possess no remarkable biocidal properties.

In contrast thereto it has now been found that highly active acaricidal and fungicidal compounds which are the object of this invention can also be obtained by converting 2.4-dimercapto-quinoxaline or its derivatives substituted in the nucleus into cyclic mercaptals or mercaptols in which the two sulfur atoms are linked via a carbon atom to form a five membered ring system.

The production of these cyclic mercaptals or mercaptols of the above general formula may be carried out by reacting any geminal dihalogen compounds with 2.3-dimercapto-quinoxaline or its nuclear substitution products in the presence of acid-binding agents, preferably at ordinary or slightly increased temperature:

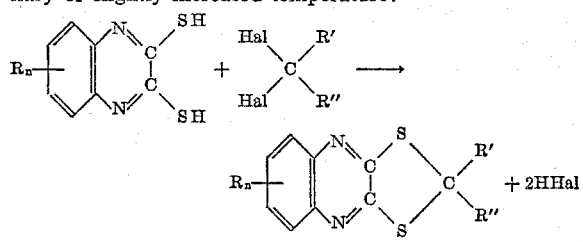

wherein R, R′ and R″ and n have the same significance as given above and more particularly they may have the following significance: If the benzene nucleus is substituted R may be a lower alkyl group, a halogen-substituted lower alkyl group, especially a chlorine and fluorine-substituted lower alkyl group, a halogen atom such as especially chlorine and bromine, a nitro-group, a lower alkoxy group or a lower alkyl mercapto group; R′ and R″ especially may be hydrogen, a possibly substituted lower alkyl group such as a halogen-substituted lower alkyl group, a hydroxy-substituted lower alkyl group, a carbonyl-substituted alkyl group, a nitro-substituted lower alkyl group, a cyano-substituted lower alkyl group, and the like, a cyclo-alkyl group, an aralkyl group, an aryl group; R′ and R″ also may form together with a geminal C-atom a carbocyclic or heterocyclic ring system which may be furthermore substituted by conventional groups. At least R′ and R″ may be also nitro-groups, cyano groups, carboxyl groups, carbon amido groups, carbonic acid groups, carbonic acid ester groups and alkyl or aryl sulfonyl groups.

For this reaction, thus, suitable geminal dihalogen compounds are those which carry hydrogen atoms as R′ and/or R″ such as methylene chloride or bromide, 1.1-dichloroethane, dichloro-acetic acid and its derivatives, benzal chloride or dibromo-acetaldehyde, di-lower-alkyl acetals or dichloro-nitro-methane, as well as those in which the two radicals R′ and R″ represent organic radicals such as 2.2-dichloro-propane or diphenyl-dichloromethane, α.α-dichloro-aceto-acetic acid esters and amides, dichloro-malonic acid esters, dichloro-maldonitrile, α.α-dichloro-acetic acid esters, di-(phenyl-sulfonyl)-dichloro-methane, and the like, and finally, also those in which the two radicals R′ and R″ are linked with one another via a carbon chain which may be interrupted by hetero-atoms such as 1.1-dichloro-cyclo-hexane, 2.2-dichloro-cyclo-hexane-dione-(1.3), 1.1-dichloro-cyclo-pentadiene as well as its higher halogenated derivatives, and the like.

Those geminal dihalogen compounds, if they are not very sensitive to hydrolysis, can easily be reacted with dimercapto-quinoxaline in an aqueous medium, acid-binding agents such as alkali metal or alkaline earth metal hydroxides or carbonates, tertiary amines being added as acid binding agents, in order to bind the liberated hydrogen halide. In some cases working in the presence of a water-miscible solvent such as alcohol, acetone, dioxane or dimethylformamide, or in a two-phase system together with a water-immiscible solvent such as toluene or benzene may be useful for the course of the reactions.

Furthermore, it is also possible and sometimes advantageous to carry out the reactions in the absence of water but in organic solvents such as alcohol, acetone, benzene or ether. Finally, in many cases solvents may be completely dispensed with, if so desired.

Instead of using acid-binding agents, the 2.3-dimercapto-quinoxalines may also be reacted in the form of metal or amine salts, with the geminal dihalogen compounds.

With appropriate methods some geminal dihalogen compounds used as reaction components, for example dichloro- or dibromo-methane, lead in some cases, in addition to the expected cyclic mercaptals, also to high molecular weight open-chain mercaptals of 2.3-dimercapto-quinoxalines on account of inter-molecular linkage, the latter compounds being likewise suitable for combating spider mites and phytopathogenic fungi. Thus, it is for example possible to obtain from 2.3-dimercapto-quinoxaline and dichloromethane a fungicidal and acaricidal compound which presumably has the following structure:

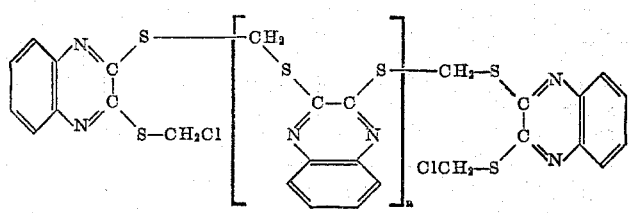

Instead of geminal dihalogen compounds, α-halogen ethers may likewise be reacted with 2.3-dimercapto-quinoxaline to give cyclic mercaptals according to the following equation:

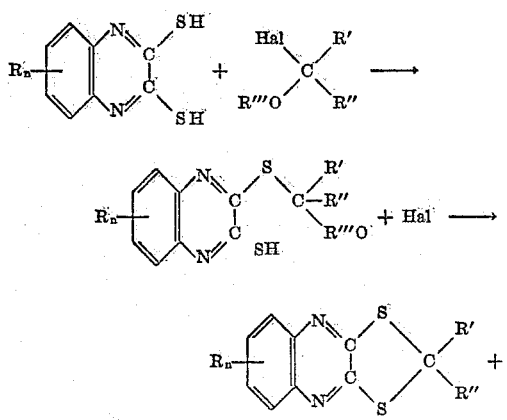

(R, R', R'' and n have the aforementioned significance; R''' stands for a lower alkyl radical), an acid-binding agent again being required for binding the liberated hydrogen halide. In the α-halogen ethers R''' should preferably be a low molecular weight alkyl radical. These reactions can be carried out under conditions similar to those indicated above for the geminal dihalogen compounds.

Finally, the cyclic mercaptals and mercaptols of 2.3-dimercapto-quinoxalines may also be produced by reacting acetals or ketals with 2.3-dimercapto-quinoxalines in the presence of suitable inter-acetalisation or inter ketalisation catalysts.

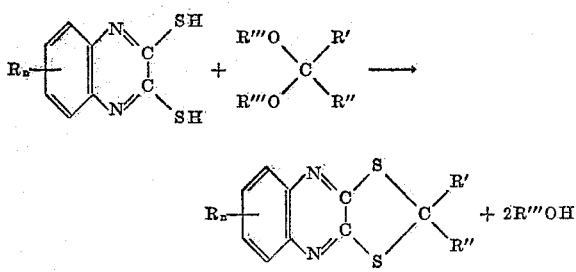

(R, R', R'', R''' and n have the aforementioned significance).

The products obtainable according to the process of the invention possess a good activity against spider mites and phytopathogenic fungi, chiefly against the species of genuine mildew.

The following table lists the lethal effect on phosphoric acid-resistant spider mites (*Tetranychus telarius*) within 48 hours of some compounds of this series; the tests have been carried out as follows: aqueous dilutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting at last this premixture with water to the desired concentration indicated in the following paragraph.

Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days; the following results have been obtained:

| Active substance | Active substance, percent H²O-emulsion | Mortality after 24 or 48 hours respectively | Degree of infestation after 8 days |
|---|---|---|---|
| Control | 0 | 0 | 5 |
| (quinoxaline-S-CH₂-S structure) | 0.2 | 80 | -------- |
| (5-CH₃ quinoxaline-S-CH₂-S structure) | 0.2 | 100 | 0 |
| (H₃C- quinoxaline-S-CH₂-S structure) | 0.2 | 100 | 0 |
| (H₃C-, H₃C- quinoxaline-S-CH₂-S structure) | 0.2 | 60 | 0-1 |
| (quinoxaline-S-CH-COOH-S structure) | 0.2 / 0.02 | 100 / 60 | -------- |
| (quinoxaline-S-CH-COOC₂H₅-S structure) | 0.2 | 90 | 1 |
| (quinoxaline-S-C(COCH₃)(COCH₃)-S structure) | 0.2 | 100 | 0 |

Note.—0=no new pests from oval, plants free of mites. 5=heavy new infestation. 1 to 4=medium evaluation numbers.

The following examples are given for the purpose of illustrating the present invention.

*Example 1*

38.8 grams of 2.3-dimercapto-quinoxaline are dissolved in a solution of 16 grams of sodium hydroxide in 80 ml. of water. The solution is diluted with 200 ml. of alcohol and 35 grams of methylene bromide are added. The mixture is stirred at 40–50° C. for 1 hour and then boiled under reflux for two hours. After cooling, the mixture is diluted with 250 ml. of water and the separated product is filtered off with suction. It is washed with water and dried. Total yield: 35 grams. By boiling the product with dioxane and treating the solutions with water, 15 grams of the cyclic mercaptal of the formula

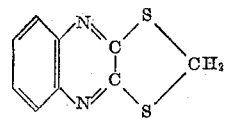

are obtained. The product melts at 162–163° C. The dioxane insoluble polymeric mercaptal, about 20 grams, melts above 300° C.

In a similar manner there are obtained from 5-methyl-2.3-dimercapto-quinoxaline a cyclic mercaptal of M.P.

139° C., and from 6-methyl-2.3-dimercapto-quinoxaline a cyclic mercaptal of M.P. 123° C.

In a strictly analogous manner there may be obtained from 5-methyl-2.3-dimercapto-quinoxaline and methylene-bromide the compounds of the following formulae

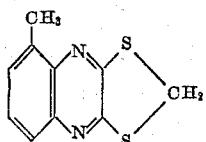

(M.P. 139° C.)

and

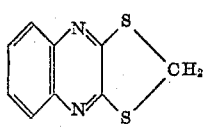

(M.P. 123° C.)

from 6-nitro-2.3-dimercapto-quinoxaline and methylene-bromide and compound of the following formula

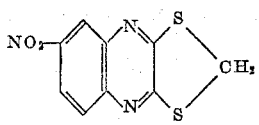

from 6.7-dimethyl-2.3-dimercapto-quinoxaline and methylene-bromide the compound of the following formula

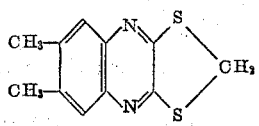

from 6-trifluoro-methyl-2.3-dimercapto-quinoxaline and methylene-bromide the compound of the following formula

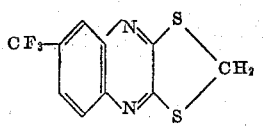

from 6-chloro-2.3-dimercapto-quinoxaline and methylene-bromide the compound of the following formula

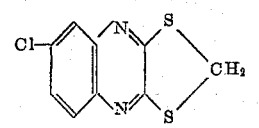

from 6-methoxy-2.3-dimercapto-quinoxaline and methylene-bromide the compound of the following formula

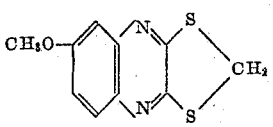

and from 2.3-dimercapto-quinoxaline and dichloro-nitromethane the compound of the following formula

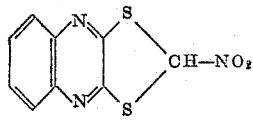

Example 2

A solution of 30 grams of 2.3-dimercapto-quinoxaline and 12.4 grams of sodium hydroxide in 100 ml. of water is diluted with 150 ml. of dioxane and treated at room temperature with 24.9 grams of benzal chloride in portions, while stirring. The mixture is stirred at room temperature for a further ½ hour, then gradually heated to boiling and boiled under reflux for 2½ hours. After cooling, the reaction mixture is treated with 500 ml. of water, the separated oil removed and stirred with a little alcohol. About 25 grams of a compound of the following formula

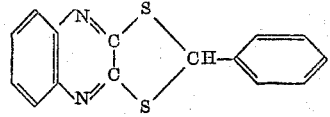

crystallize out which can be purified by dissolving in benzene and precipitation with ligroin. M.P. 215–220° C.

In an analogous manner the 2.3-dimercapto-quinoxaline reacts with 4-chloro-benzal-chloride to give the compound of the following formula

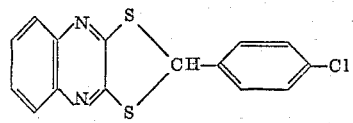

with 4-nitro-benzal-chloride to give the compound of the following formula

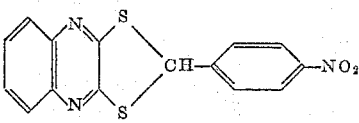

with diphenyl-dichloro-methane to give the compound of the following formula

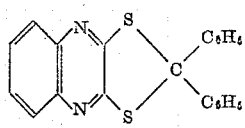

with 2.2-dichloropropane to give the compound of the following formula

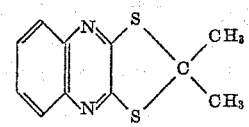

Example 3

30 grams of 2.3-dimercapto-quinoxaline and 12.4 grams of sodium hydroxide are dissolved in 100 ml. of water and treated with 200 ml. of alcohol. 33 grams of $\alpha.\beta.\beta.\beta$-tetrachloroethyl ether are added dropwise while stirring and cooling. The cold mixture is stirred for a further ½ hour, then gradually heated and, finally, boiled under reflux for 2 hours. The alcohol is distilled off to a great extent under atmospheric pressure. The residue consisting of two layers is cooled. Upon the addition of a little petroleum ether about 10 grams of a yellow product precipitate from the separated oily layer which are filtered off with suction and dried. They can be purified by dissolving in carbon tetrachloride and precipitation with ligroin. The compound thus obtained melts at 203° C. and has a chlorine content of 25% corresponding to the formula

Example 4

20 grams of 2.3-dimercapto-quinoxaline are dissolved with 8 grams of sodium hydroxide in 50 ml. of water, whereupon 100 ml. of ethanol are added. Into this mixture while stirring 12.8 grams of dichloro-acetic acid amide are given in small portions. Stirring is continued for 1 further hour at room temperature and thereafter the reaction is completed for 1 further hour stirring at 50 to 60° C. The mixture then is cooled and the reaction product is precipitated by adding water. After filtration with suction and drying there are obtained 50 grams of the following compound

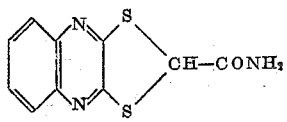

(M.P. 247° C. from glycol-monomethyl-ether)

after recrystallization from glycol-monomethyl ether.

In an analogous manner from di-chloro-acetic acid-dimethyl-amide there is obtained the compound of the following formula

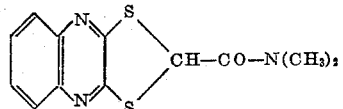

(M.P. 222–224° C. from dioxane)

and with dichloro-acetic acid-propyl-amide there is obtained the compound of the following formula

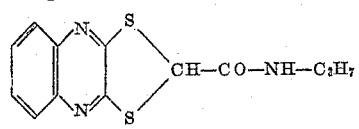

(M.P. 227–228° C. from dioxane)

with dichloro-acetic acid-anilide there may be obtained the compound of the following formula

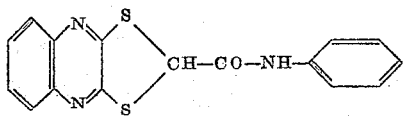

(M.P. 235–236° C. from dioxane)

and with 2.3-dimercapto-6-chloro-quinoxaline and dichloro-acetic acid-diethyl ester the following compound may be obtained

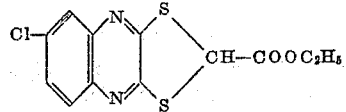

Example 5

29.9 grams of 2.3-dimercapto-quinoxaline are dissolved in 100 ml. of water by means of 12 grams of sodium hydroxide and after filtration with 150 ml. of acetone there are added at room temperature while stirring 34.5 grams of dichloro-malonic acid diethyl ester dropwise. The temperature amounts to 35 to 40° C. due to the exothermic reaction. Stirring is continued for 1 further hour whereupon the reaction product is precipitated by addition of water. The reaction product is filtered off with suction and recrystallized from ethanol. There are obtained 25.5 grams of the following compound

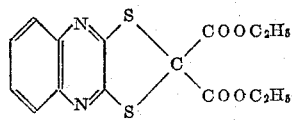

(M.P. 132° C.)

By exactly the same method there may be obtained the following compounds starting from α.α-dichloroacetic acid ethyl ester:

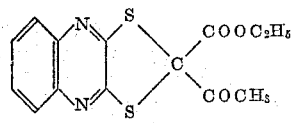

(M.P. 105° C. from alcohol)

from 3.3-dichloro-pentadione-(2.4):

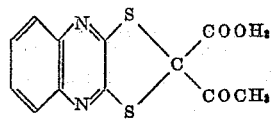

(M.P. 142° C. from alcohol)

from ω.ω-dichloro-acetophenone:

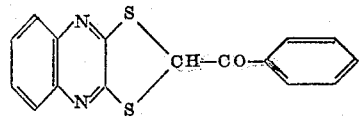

(M.P. 164–165° C. from benzene)

and from 2.2-dichloro-cyclohexandione-(1.3):

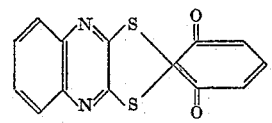

(Decomposition at 200° C.)

from 2.3-dimercapto-quinoxaline and dibromo-acetaldehyde-diethyl-acetal:

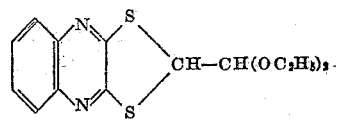

from 2.3-dimercapto-quinoxaline and di(phenyl-sulfonyl)-dichloro-methane:

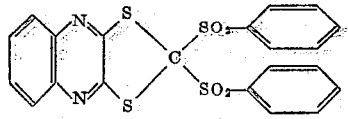

from 6-methyl-2.3-dimercapto-quinoxaline and 3.3-dichloro-pentandione-(2.4):

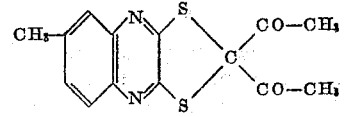

(M.P. 105–106° C.)

from 6-trifluoro-methyl-2.3-dimercapto-quinoxaline and 3.3-dichloro pentandione-(2.4):

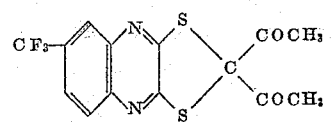

(M.P. 120° C.)

Example 6

A solution of 30 grams of 2.3-dimercapto-quinoxaline-(by means of 13 grams of sodium hydroxide) in 50 ml. of water and 150 ml. of ethanol is treated portionwise while stirring and at room temperature with 42 grams of hexa-chloro-cyclopenta-diene. The reaction is exothermic and a precipitate is formed almost immediately. After the addition of hexa-chloro-cyclo-penta-diene is finished stirring is continued for 30 minutes at room temperature and the reaction mixture then is heated to the boiling and left there for 1 further hour. After cooling 500 ml. of water are added, and the reaction product is isolated by filtration with suction. The dried product is purified by treating it thrice with 500 ml. of boiling alcohol. After concentration of the alcoholic solution the remainder is recrystallized from ligroin. There are obtained 5 grams of the following compound

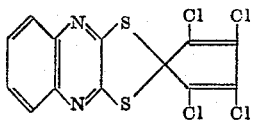

(M.P. 185° C.)

We claim:
1. The compound of the following formula

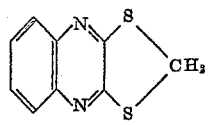

2. The compound of the following formula

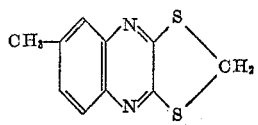

3. The compound of the following formula

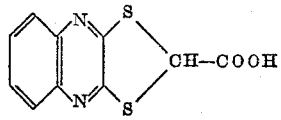

4. The compound of the following formula

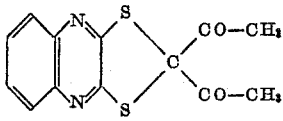

5. The compound of the following formula

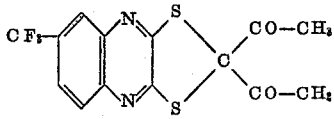

6. A compound of the formula

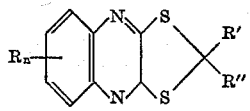

wherein $n$ stands for a number from 0 to 4, R stands for a member selected from the group consisting of hydrogen, lower alkyl having up to 4 carbon atoms, halogen lower alkyl, lower alkoxy groups, lower alkylmercapto groups, nitro and halogen; R' and R'' are members selected from the group consisting of hydrogen, lower alkyl, halogens lower alkyl, phenyl chlorophenyl, nitrophenyl, lower alkyl carbonyl, phenyl-carbonyl, carbonamido, lower alkyl substituted carbonamido, phenyl substituted carbonamido, carboxyl, lower alkoxy carbonyl groups, cyano groups, nitro, and when taken together with the geminal carbon atom, chloro-substituted cyclo-pentadiene.

No references cited.

UNITED STATES PATENT OFFICE
CERTIFICATION OF CORRECTION

Patent No. 3,029,238                  April 10, 1962

Klaus Sasse et al.

It is hereby certified that error appears in the above numbered patent requiring correction and that the said Letters Patent should read as corrected below.

Column 1, line 37, for "2.4" read -- 2.3 --; column 5, line 23, for "and" read -- the --; column 7, line 67, for "dichloroacetic" read -- dichloroacetoacetic --; column 8, lines 19 to 23, the structural formula should appear as shown below instead of as in the patent:

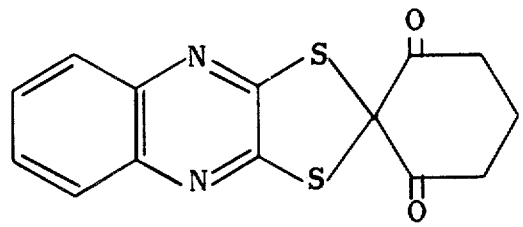

Signed and sealed this 2nd day of October 1962.

(SEAL)
Attest:

ERNEST W. SWIDER
Attesting Officer

DAVID L. LADD
Commissioner of Patents